United States Patent
Zhang et al.

(10) Patent No.: US 12,106,242 B2
(45) Date of Patent: Oct. 1, 2024

(54) MULTI-VEHICLE COORDINATION-BASED VEHICLE SCHEDULING SYSTEM AND METHOD, ELECTRONIC APPARATUS, AND STORAGE MEDIUM

(71) Applicant: UISEE (SHANGHAI) AUTOMOTIVE TECHNOLOGIES LTD, Shanghai (CN)

(72) Inventors: Xiaomeng Zhang, Shanghai (CN); Yuqiang Xian, Shanghai (CN)

(73) Assignee: UISEE (SHANGHAI) AUTOMOTIVE TECHNOLOGIES LTD, Shanghai (CN)

( * ) Notice: Subject to any disclaimer, the term of this patent is extended or adjusted under 35 U.S.C. 154(b) by 0 days.

(21) Appl. No.: 17/912,533

(22) PCT Filed: Mar. 18, 2020

(86) PCT No.: PCT/CN2020/080052
§ 371 (c)(1),
(2) Date: Sep. 19, 2022

(87) PCT Pub. No.: WO2021/184265
PCT Pub. Date: Sep. 23, 2021

(65) Prior Publication Data
US 2023/0136829 A1    May 4, 2023

(51) Int. Cl.
*G06Q 10/0631* (2023.01)
*G06Q 10/0835* (2023.01)

(52) U.S. Cl.
CPC ............ *G06Q 10/06316* (2013.01); *G06Q 10/08355* (2013.01)

(58) Field of Classification Search
None
See application file for complete search history.

(56) References Cited

U.S. PATENT DOCUMENTS 9,786,187 B1 * 10/2017 Bar-Zeev ............. G08G 5/0069
10,198,707 B1 * 2/2019 Bolton ............. G06Q 10/08355
(Continued)

FOREIGN PATENT DOCUMENTS

| CN | 104809549 A | 7/2015 |
|---|---|---|
| CN | 108171428 A | 6/2018 |

(Continued)

OTHER PUBLICATIONS

C. Zhu, L. Tang and W. Zhang, "Multi-vehicle coordination and flexible scheduling based on Simulated Annealing Algorithm," The 26th Chinese Control and Decision Conference (2014 CCDC), Changsha, China, 2014, pp. 2686-2691. https://ieeexplore.IEEE.org/abstract/document/6852627. (Year: 2014).*

*Primary Examiner* — Eric W Stamber
*Assistant Examiner* — Alissa D Karmis
(74) *Attorney, Agent, or Firm* — Bayramoglu Law Offices LLC

(57) ABSTRACT

A multi-vehicle coordination-based vehicle scheduling system and method, an electronic apparatus, and a storage medium. The scheduling system includes a parameter module configured for determining a scheduling parameter; a scheduling module configured for determining a scheduling result; a coordination module configured for determining a coordination impact value; a correction module configured for correcting the scheduling parameter, the correction module judging whether the coordination impact value is no less than a preset threshold, correcting the scheduling parameter based on a judgment result that the coordination impact value is no less than the preset threshold, and re-determining the scheduling result and the coordination impact value based on the corrected scheduling parameter; and an output module configured for outputting the scheduling result based on the judgment result that the coordination impact value is less than the preset threshold. Sequence order and task (Continued)

assignment problems when scheduling multiple vehicles are effectively solved.

19 Claims, 3 Drawing Sheets

(56) References Cited

U.S. PATENT DOCUMENTS

| | | | |
|---|---|---|---|
| 2017/0046653 A1* | 2/2017 | Wilson | G06Q 10/0838 |
| 2018/0315319 A1* | 11/2018 | Spector | G08G 1/202 |
| 2018/0341918 A1 | 11/2018 | Raut et al. | |
| 2019/0051159 A1* | 2/2019 | Wang | G08G 1/0133 |
| 2019/0066041 A1* | 2/2019 | Hance | G01C 21/3407 |

FOREIGN PATENT DOCUMENTS

| | | | | |
|---|---|---|---|---|
| CN | 109215333 A | 1/2019 | | |
| CN | 110109448 A | 8/2019 | | |
| JP | 2010150020 A | 7/2010 | | |
| KR | 20070074676 A | 7/2007 | | |
| KR | 20160143040 A | 12/2016 | | |
| WO | WO-2017197468 A1 * | 11/2017 | | |
| WO | WO-2019084794 A1 * | 5/2019 | | G01C 21/3438 |
| WO | WO-2020055769 A1 * | 3/2020 | | |

* cited by examiner

MULTI-VEHICLE COORDINATION-BASED VEHICLE SCHEDULING SYSTEM AND METHOD, ELECTRONIC APPARATUS, AND STORAGE MEDIUM

CROSS REFERENCE TO THE RELATED APPLICATIONS

This application is the national phase entry of International Application No. PCT/CN2020/080052, filed on Mar. 18, 2020 without claiming priority, the entire contents of which are incorporated herein by reference.

TECHNICAL FIELD

The present disclosure relates to the technical field of vehicle scheduling, and more particularly, to a multi-vehicle coordination-based vehicle scheduling system and method, an electronic apparatus and a storage medium.

BACKGROUND

In logistics transportation, one or more transportation tasks are usually completed by multiple vehicles, so that it is very important to make reasonable overall arrangement of vehicles. At present, there may be problems of vehicle driving route conflict and multi-vehicle congestion when the multiple vehicles complete the transportation tasks, resulting in low completion efficiency of transportation tasks.

It can be seen that how to solve the problem of impractical scheduling is an urgent issue to be solved by those skilled in the art.

SUMMARY

The present disclosure is proposed in view of the above problems. The present disclosure provides a multi-vehicle coordination-based vehicle scheduling system and method, an electronic apparatus, and a storage medium.

An aspect of the present disclosure provides a multi-vehicle coordination-based vehicle scheduling system. The multi-vehicle coordination-based vehicle scheduling system includes: a parameter module configured for determining a scheduling parameter; a scheduling module configured for determining a scheduling result based on the scheduling parameter; a coordination module configured for determining a coordination impact value based on the scheduling result; a correction module configured for correcting the scheduling parameter based on the coordination impact value, where the correction module judges whether the coordination impact value is no less than a preset threshold, corrects the scheduling parameter based on a judgment result that the coordination impact value is no less than the preset threshold, and re-determines the scheduling result and the coordination impact value based on the corrected scheduling parameter; and an output module configured for outputting the scheduling result based on the judgment result that the coordination impact value is less than the preset threshold.

Another aspect of the present disclosure provides an electronic apparatus, including a processor, a memory and an I/O interface, where the I/O interface is connected with the processor and the memory, and is configured for implementing information interaction between the memory and the processor; the memory stores corresponding modules for implementing the vehicle scheduling system; and the processor is configured for running the modules stored in the memory to execute the vehicle scheduling system.

Another aspect of the present disclosure provides a multi-vehicle coordination-based vehicle scheduling method, including: acquiring a scheduling parameter; determining a scheduling result based on the scheduling parameter; determining a coordination impact value based on the scheduling result; judging whether the coordination impact value is no less than a preset threshold, correcting the scheduling parameter based on a judgment result that the coordination impact value is no less than the preset threshold, and re-determining the scheduling result and the coordination impact value based on the corrected scheduling parameter; and outputting the scheduling result based on the judgment result that the coordination impact value is less than the preset threshold.

Another aspect of the present disclosure provides a computer-readable storage medium, where a program or instruction is stored on the computer-readable storage medium, and the program or instruction enables a computer to execute the steps of the multi-vehicle coordination-based vehicle scheduling method.

By providing the multi-vehicle coordination-based vehicle scheduling system and method, the electronic apparatus and the storage medium, the embodiments of the present disclosure can effectively solve sequence order and task assignment problems when scheduling multiple vehicles, and perfect and solve problems of multi-vehicle conflict, congestion and impractical arrangement caused by multi-vehicle operation, thus effectively improving the completion efficiency of transportation tasks.

BRIEF DESCRIPTION OF THE DRAWINGS

The foregoing and other objects, features and advantages of the present disclosure will become more apparent by a more detailed description of embodiments of the present disclosure in conjunction with the accompanying drawings. The accompanying drawings are used to provide further understanding of embodiments of the present disclosure and form part of the specification and, together with embodiments of the present disclosure, are used to explain the disclosure and do not constitute a limitation of the disclosure. In the accompanying drawings, identical reference marks generally represent identical parts or steps.

DETAILED DESCRIPTION OF THE EMBODIMENTS

To make the objects, technical solutions, and advantages of the present disclosure more clear, exemplary embodiments of the present disclosure will be described in detail with reference to the accompanying drawings as follows. Obviously, the described embodiments merely are part of the embodiments of the present disclosure, rather than all of the embodiments of the present disclosure, it should be understood that the present disclosure is not limited to the exemplary embodiments described herein.

The present disclosure proposes a multi-vehicle coordination-based vehicle scheduling system. In some embodiments, the vehicle scheduling system may be applied to logistics, transportation, rental, park operation, man riding and other aspects. The vehicle scheduling system may also be configured for alleviating a congestion phenomenon in a traffic system. In some embodiments, the vehicle scheduling system may schedule multiple vehicles in a preset area, the multiple vehicles may be smart driving vehicles, and may also be manual driving vehicles, where the manual driving vehicles may receive scheduling from the vehicle scheduling system. In some embodiments, the preset area may be a defined operating area. In some embodiments, the vehicle scheduling system may have multiple subsystems, where each subsystem is used to manage vehicles in one operating area, while the vehicle scheduling system is used to manage and coordinate vehicles in the multiple subsystems and all operating areas. In some embodiments, the vehicle scheduling system may calculate an estimated arrival time of multiple vehicles from a starting point to a destination, calculate impact factors according to driving conditions of different vehicles, and reschedule different vehicles based on the impact factors.

Figure 1:
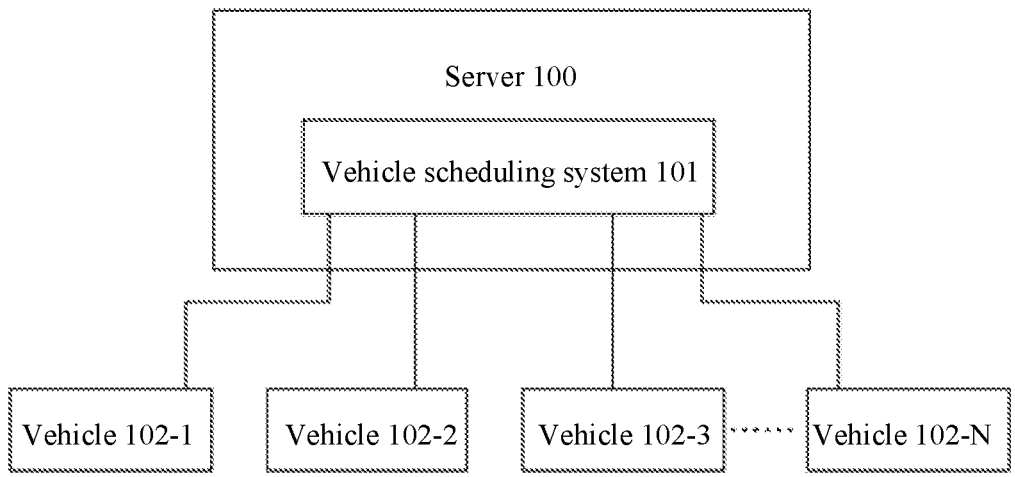
FIG. 1 shows a scene diagram of a vehicle scheduling system according to one embodiment of the present disclosure.

FIG. 1 is a typical scene diagram of the vehicle dispatching system provided by an embodiment of the present disclosure. The scene includes a server 100, and multiple vehicles 102-1, 102-2, 102-3, . . . , and 102-N, where the server 100 includes a scheduling system 101.

As shown in FIG. 1, the server 100 is used to coordinate and schedule vehicles in a defined area. In some embodiments, the server 100 may send a scheduling instruction to the vehicle for the vehicle to plan a trip thereof. The server 100 may carry out cooperative processing based on the driving conditions of the multiple vehicles, such as the traffic conditions of the vehicles in the scheduling process and the scheduling conditions of the vehicles, so that the trips of all the vehicles meet certain requirements, such as a shortest travel time or a shortest total travel distance.

The server 100 may send a control instruction to the vehicle to control the vehicle to coordinate with other vehicles.

The server 100 includes the scheduling system 101. The scheduling system 101 is configured for generating a scheduling instruction and sending the scheduling instruction to the vehicle. The scheduling system 101 receives a task request and a scheduling condition, and generates scheduling information based on the task request and scheduling condition received. The scheduling information refers to a mapping relation between the vehicle and the task. The mapping relation may be one-to-one, one-to-multiple or multiple-to-one mapping.

The vehicle 102 is configured for receiving the information from the server 100 and planning and controlling based on the information. The vehicle may be a manual driving vehicle or a self-driving vehicle. In some embodiments, the vehicle is an unmanned vehicle, the server sends a scheduling instruction to the self-driving vehicle, and the self-driving vehicle controls the vehicle to travel according to the scheduling instruction received. In some embodiments, the vehicle has a driver, and the driver controls the vehicle according to the d scheduling instruction received by the vehicle. The self-driving vehicle may also receive a control instruction from the server.

Figure 2:
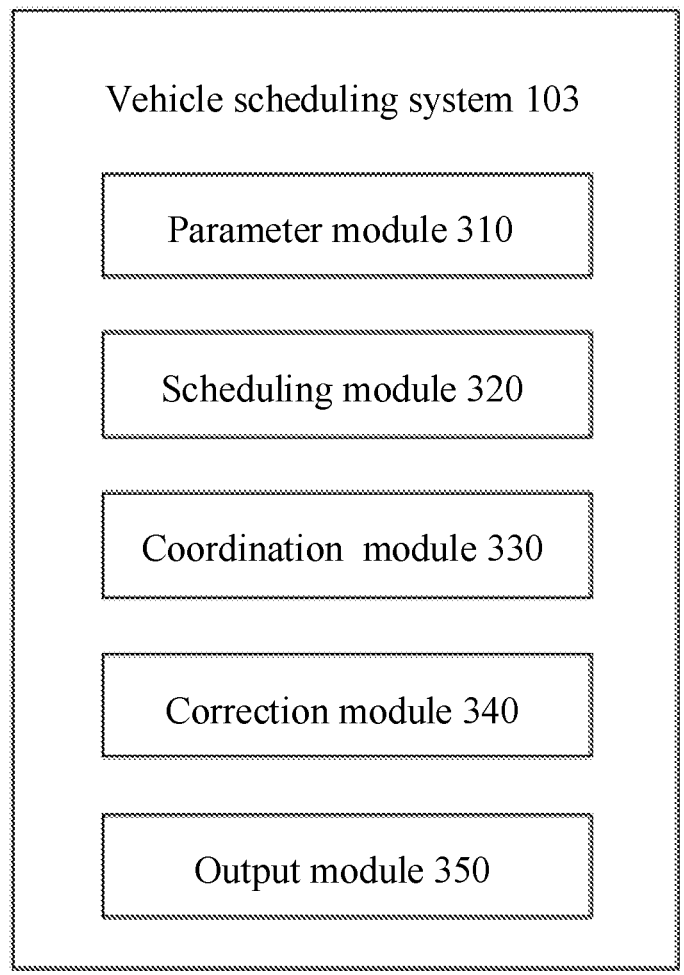
FIG. 2 shows a schematic diagram of a vehicle scheduling system according to one embodiment of the present disclosure.

FIG. 2 shows a schematic block diagram of a vehicle scheduling system according to one embodiment of the present disclosure, and the scheduling system 103 has the same configuration or structure as the scheduling system 101 shown in FIG. 1.

As shown in FIG. 2, the vehicle scheduling system includes a parameter module 310, a scheduling module 320, a coordination module 330, a correction module 340, an output module 350 and other components or modules that may be used for vehicle scheduling.

The parameter module 310 is configured for determining a scheduling parameter; and the parameter module 310 determines the scheduling parameter based on a current transportation task request and a current scheduling condition. In some embodiments, the scheduling parameter includes a transportation task attribute and a scheduling condition. The transportation task attribute includes a starting port and an ending point of a transportation task. In some embodiments, the transportation task attribute further includes at least one of a transportation volume of the transportation task, an earliest starting time of the transportation task, a latest starting time of the transportation task, an earliest ending time of the transportation task and a latest ending time of the transportation task. In some embodiments, the transportation task attribute includes duration to complete the transportation task, for example, the transportation task has to be completed within 30 minutes, the transportation task has to be completed within 1 hour, or the like. In some embodiments, the transportation task attribute further includes a transportation temperature requirement, such as normal temperature transportation, refrigerated transportation and frozen transportation. The transportation task attribute may also include a specific temperature requirement, for example, the temperature is no higher than 40 degrees Celsius or the temperature is no lower than 36 degrees Celsius. The scheduling system schedules the vehicles based on one or more transportation tasks.

In some embodiments, the scheduling parameter further includes a vehicle attribute. In some embodiments, the vehicle attribute includes an estimated arrival time of a vehicle in a transportation area, where the estimated arrival time includes an estimated arrival time of each vehicle among various places in the operating area. The estimated arrival time of the vehicle is a time for the vehicle to drive from one place to another place according to historical data. The estimated arrival time of different vehicles at the same starting point and the same destination may be the same or different.

There may be more than one estimated arrival time of the same vehicle at the same starting point and destination. For example, driving in different time periods and different routes may have different estimated arrival time, and the same route may have different estimated arrival time under different road congestion conditions. For example, the estimated arrival time varies with the conditions of the vehicle.

The estimated arrival time is a time point, such as 8:5, 9:10, or the like. For example, the vehicle starts from a place A at a time T1 and arrives at a place B at a time T2, then the estimated arrival time of the vehicle from the place A to the place B is T2. The estimated arrival time for different vehicles started at the same time from one place A to another place C in the operating area may be the same or different. In some embodiments, there may be one or two or more estimated arrival time for the vehicle to depart from one place A to another place C at the same time. If the estimated arrival time of a vehicle from the place A to the place C after passing the place B at 9:15 is 9:30 and the estimated arrival time of the vehicle from the place A to the place C after passing the place B and a place D is 9:50, then the estimated arrival time of the vehicle from the place A to the place C includes 9:30 and 9:50. The estimated arrival time of the vehicle is statistically obtained from historical running data of the vehicle. It is understood that the estimated arrival time of the vehicle may also be calculated based on a distance between the places and a speed of the vehicle. In some embodiments, the estimated arrival time of the vehicle also takes into account weather conditions. For example, the vehicle departs from the place A to a place E at 8:15, and the estimated arrival time on a sunny day is 8:30; the estimated arrival time from the place A to the place E in heavy fog weather is 8:40, and the estimated arrival time from the place A to the place E in snowy weather is 8:50.

In some embodiments, the vehicle attribute further includes at least one of a vehicle capacity, a vehicle load and vehicle energy consumption. The vehicle capacity may include a total capacity and a remaining capacity of the available vehicle. For example, the total capacity of the vehicle is 7 people, 2 people are loaded, and the remaining capacity is 5 people. In the case of an unloaded vehicle, the remaining capacity of the vehicle is equal to the total capacity of the vehicle. Similarly, the vehicle load includes a maximum load weight and an available load weight of the vehicle, for example, the maximum load weight of the vehicle is 1.8 tons, the loaded load is 0.5 tons, and the available load weight is 1.3 tons. In the case of an unloaded vehicle, the maximum load weight of the vehicle is equal to the available load weight of the vehicle. The vehicle energy consumption includes energy consumed per kilometer and remaining energy of the vehicle. For example, the vehicle capacity includes a total loadable volume and a remaining loadable volume of the vehicle. If the vehicle is a gasoline vehicle, the vehicle energy consumption of the vehicle includes an amount of gasoline consumed by the vehicle per kilometer and a remaining amount of gasoline of the vehicle; if the vehicle is a diesel vehicle, the vehicle energy consumption of the vehicle includes an amount of diesel oil consumed by the vehicle per kilometer and a remaining amount of diesel oil of the vehicle; if the vehicle is an electric car, the vehicle energy consumption of the vehicle includes an amount of electricity quantity consumed by the vehicle per kilometer and a remaining amount of electricity quantity of the vehicle; and if the vehicle is a Liquefied Natural Gas (LNG) vehicle, the vehicle energy consumption of the vehicle includes an amount of LNG consumed per kilometer of the vehicle and a remaining amount of LNG of the vehicle.

In some embodiments, the scheduling condition includes at least one of a shortest total travel distance, a shortest total time for the vehicle to complete the transportation task, minimum total vehicle energy consumption of the vehicle, and a minimum number of called vehicles. It is understood that the shortest total travel distance of the vehicle is the shortest total travel distance of the vehicle used to complete a transportation task. The shortest total time for the vehicle to complete the transportation task is the shortest total time for the vehicle to complete a transportation task from start to stop. The minimum number of called vehicles means the minimum number of vehicles used to complete a transportation task. It is understood that the scheduling conditions may be changed according to the needs of the transportation task. The above is only an example of the scheduling condition, and the scheduling condition may be other suitable condition that meets the needs of the transportation task The scheduling module 320 is configured for determining a scheduling result based on the scheduling parameter. In some embodiments, the scheduling result includes: multiple-to-one, one-to-multiple or multiple-to-multiple mapping between the transportation task and the vehicle.

The multiple-to-one mapping between the transportation task and the vehicle means that multiple transportation tasks are completed by one vehicle; the one-to-multiple mapping between the transportation task and the vehicle means that one transportation task is completed by multiple vehicles; and the multiple-to-multiple mapping between the transportation task and the vehicle means that multiple transportation tasks are completed by multiple vehicles. In some embodiments, the transportation task may include one or more subtasks. For example, one transportation subtask is to transport W from the place A to the place B, and another transportation subtask is to transport Y from the place C to the place B; for example, one transportation task is to transport 2M tons of goods from the place A to the place B, and a maximum load of one vehicle is M tons, then 2 vehicles are required to jointly complete this transportation task. The estimated arrival time of the vehicle in the scheduling result is the estimated arrival time of the vehicle to complete the transportation task.

In some embodiments, the scheduling module may determine the scheduling result based on static scheduling or dynamic scheduling. The static scheduling refers to determining the scheduling result based on a meta-heuristic algorithm with high precision, and the dynamic scheduling refers to determining the scheduling result based on a heuristic algorithm with high real-time performance.

Based on the static scheduling, the scheduling module uses the meta-heuristic algorithm. The meta-heuristic method is characterized in that a random algorithm is combined with a local search algorithm, and exploration is performed in a search space through continuous iteration. The meta-heuristic algorithm usually adopts a heuristic algorithm to generate one or a group of initial solutions, then carries out random transformation on the initial solutions to generate new solutions, then carries out evaluation on the new solutions and compares the new solutions with the original solutions, receives the new solutions through a certain rule as the start of next iteration, and thus obtains the optimal/approximately optimal solutions through continuous iteration. In some embodiments, the meta-heuristic algorithm includes, but is not limited to, genetic algorithms, simulated annealing algorithms, tabu searches, particle swarm algorithms, ant colony algorithms, and the like.

Based on the dynamic scheduling, the scheduling module uses the heuristic algorithm. The heuristic algorithm is an algorithm based on intuitive or empirical construction that gives a feasible solution for problem optimization under acceptable conditions. In some embodiments, the heuristic algorithm includes, but is not limited to, saving methods, scanning methods, interpolation methods, and the like.

The estimated arrival time of the vehicle in the scheduling result may include one or more estimated arrival time of the vehicle. For example, a scheduling task is to transport W from the place A to the place B, and a road from the place A to the place B passes through a place F, so the estimated arrival time of the vehicle in the corresponding scheduling result includes the estimated arrival time of the vehicle from the place A to the place B, and may further include the estimated arrival time of the vehicle from the place A to the place F and the estimated arrival time of the vehicle from the place F to the place B.

The coordination module 330 is configured for determining the coordination impact value of the coordination area based on the scheduling result.

The coordination impact value refers to an impact on the estimated arrival time caused by multiple vehicles when completing the transportation task. In some embodiments, the coordination impact value includes an estimated arrival time impact value or a coordination scheduling impact factor. The estimated arrival time impact value refers to an impact on the estimated arrival time of each vehicle in an area that needs coordination. The coordination module 330 determines the area that needs coordination and coordination vehicles according to the scheduling result, determines a release sequence and a waiting time of each coordination vehicle in the coordination area, determines an estimated arrival time of each vehicle after coordination based on the release sequence and scheduling time, and determines the impact value based on the estimated arrival time after coordination and the estimated arrival time before coordination.

The estimated arrival time impact value refers to a difference of the estimated arrival time of the vehicle after coordination and the corresponding estimated arrival time of the vehicle before coordination. For the vehicle 102-8, the estimated arrival time impact value of the vehicle 102-8 arriving at a subsequent place G after leaving the coordination area refers to a difference value between the estimated arrival time after coordination of the vehicle 102-8 arriving at the place G and the estimated arrival time before coordination. For the vehicle 102-8, the estimated arrival time impact value refers to a sum of the estimated arrival time impact value of the vehicle 102-8 arriving at each subsequent place after leaving the coordination area. Due to the phenomenon of waiting for some vehicles in multi-vehicle coordination, the estimated arrival time of these vehicles to some task points will become larger. The estimated arrival time impact value is a sum of the differences by subtracting the estimated arrival time before coordination from the estimated arrival time of the vehicles after coordination to each place finish the transportation task, and the estimated arrival time impact value is a positive number. In some embodiments, a transportation task is completed, where a task assigned to the vehicle 102-1 is to travel from the place A to the place B and then from the place C to the place D, and a task assigned to the vehicle 102-2 is to travel from the place E to the place F, and before the coordination, the vehicle 102-1 starts from the place A at 8:15, takes 25 minutes to complete all tasks, and the estimated arrival time at the end point D of the transportation task is 8:40. Before coordination, the vehicle 102-2 departs from the place E at 8:10, takes 30 minutes to complete the task, and the estimated arrival time at the end point F of the transportation task is 8:40. After the coordination, the vehicle 102-1 waits for 5 minutes at an intersection with the vehicle 102-2 on the way to the place B, while the vehicle 102-2 does not need to wait. Then, after the coordination, the estimated arrival time of the vehicle 102-1 at the place B is increased by 5 minutes, the estimated arrival time at the place C is increased by 5 minutes, the estimated arrival time at the place D is increased by 5 minutes, and the estimated arrival time impact value for the vehicle 102-1 to complete the transportation task is 15 minutes, while the estimated arrival time of the vehicle 102-2 is unchanged, and the estimated arrival time impact value is 0. The estimated arrival time impact value of the coordination area refers to a sum of the estimated arrival time impact values of all vehicles in the area.

In some embodiments, on the basis that the coordination impact value impact value is the estimated arrival time impact value, the coordination module 330 determines the coordination impact value, including: determining a coordination area first; determining a release sequence of each vehicle and a waiting time of each vehicle in the coordination area; and determining the estimated arrival time impact value of the coordination area based on the release sequence of each vehicle and the waiting time of each vehicle.

In some embodiments, the coordination scheduling impact factor is a ratio of an estimated arrival time impact value for one vehicle to complete a transportation task to a total duration for completing the transportation task before coordination. In some embodiments, a transportation task is completed, where a task assigned to the vehicle 102-1 is to travel from the place A to the place B and then from the place C to the place D, and a task assigned to the vehicle 102-2 is to travel from the place E to the place F, and before the coordination, the vehicle 102-1 starts from the place A at 8:15, takes 25 minutes to complete all tasks, and the estimated arrival time at the end point D of the transportation task is 8:40. Before coordination, the vehicle 102-2 departs from the place E at 8:10, takes 30 minutes to complete the task, and the estimated arrival time at the end point F of the transportation task is 8:40. After the coordination, the vehicle 102-1 waits for 5 minutes at an intersection with the vehicle 102-2 on the way to the place B, while the vehicle 102-2 does not need to wait. Then, after the coordination, the estimated arrival time of the vehicle 102-1 at the place B is increased by 5 minutes, the estimated arrival time at the place C is increased by 5 minutes, the estimated arrival time at the place D is increased by 5 minutes, the estimated arrival time impact value of the vehicle 102-1 for completing the transportation task is 15 minutes, and the coordination scheduling impact factor of the vehicle 102-1 is 0.6 (15/25=0.6), while the estimated arrival time of the vehicle 102-2 is unchanged, the estimated arrival time impact value is 0, and the coordination scheduling impact factor of the vehicle 102-2 is 0 (0/30=0). Before the coordination, the coordination scheduling impact factor of the coordination area refers to a sum of the coordination scheduling impact factors of all vehicles in the area.

In some embodiments, on the basis that the coordination impact value impact value is the coordination scheduling impact factor, the coordination module 330 determines the coordination impact value, including: determining a coordination area; determining a release sequence of each vehicle and a waiting time of each vehicle in the coordination area; determining the estimated arrival time impact value of the coordination area based on the release sequence of each vehicle and the waiting time of each vehicle; and determining the coordination scheduling impact factor of the coordination area based on the estimated arrival time impact value and the estimated arrival time before coordination.

The correction module 340 is configured for correcting the scheduling parameter based on the coordination impact value of the coordination area. In some embodiments, the correction module may correct the scheduling parameter based on the coordination impact value of the coordination area. In some embodiments, the correction module 340 may correct the scheduling parameter by adjusting the estimated arrival time of the vehicle after coordination. In some embodiments, the adjusting the estimated arrival time of the vehicle after coordination may be to adjust the estimated arrival time of the vehicle after coordination to complete the transportation task, thus reducing the coordination impact value.

In some embodiments, the adjusting the estimated arrival time of the vehicle after coordination is to convert the impact of the coordination into the estimated arrival time after coordination in the new scheduling parameter. In some embodiments, for all vehicles involved in the coordination area that needs to wait, the sequence of the vehicles before arriving at the coordination area remains unchanged, and the transportation tasks after arriving at the coordination area are rescheduled.

In some embodiments, the correction module 340 may correct the scheduling parameter by adjusting a driving route of the vehicle.

The correction module 340 judges whether the coordination impact value of the coordination area is no less than a preset threshold, corrects the scheduling parameter based on a judgment result that the coordination impact value is no less than the preset threshold, and re-determines the scheduling result and the coordination impact value based on the corrected scheduling parameter. The adjusting the estimated arrival time in an area with a maximum coordination impact value refers to adjusting an estimated arrival time after coordination of the vehicle leaving the coordination area to a starting point and an ending point of a subsequent task.

This will result in one or more of the following results, including, but not limited to: changing the release sequence of the vehicles outside the area with the maximum coordination impact value, changing the driving route of the vehicle, changing the waiting time of the vehicle, and the like.

The adjusting the driving route of the vehicle may result in one or more of the following results, including, but not limited to: the vehicle changes the driving route and does not enter the area with the maximum coordination impact value, so that the impact brought by the multi-vehicle coordination is reduced; and the number of vehicles in the area with the coordination impact value is reduced, so that the impact brought by the multi-vehicle coordination is reduced.

The output module 350 is configured for outputting the scheduling result when the judgment result is less than the preset threshold.

The output module 350 receives the scheduling result of the correction module and sends the scheduling result to the vehicle.

Those skilled in the art will appreciate that many variations and modifications are possible in light of the contents disclosed by the present application. For example, the different functional components described above are all implemented by hardware devices, but may also be implemented by software solutions only. For example, a system is installed on an existing server. The contents disclosed herein may be implemented via a firmware, firmware/software combination, firmware/hardware combination, or hardware/firmware/software combination. For example, the coordination module and the correction module may be integrated to uniformly complete the coordination scheduling of the vehicles. For another example, the correction module and the output module may be integrated to uniformly complete the coordination scheduling of the vehicles.

Figure 3:
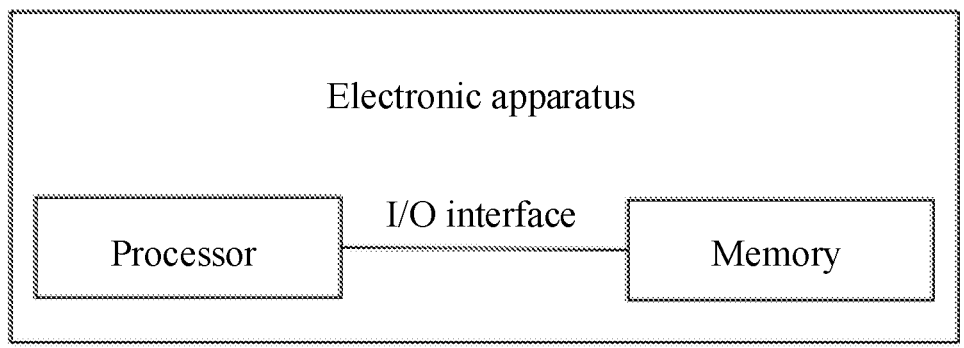
FIG. 3 shows a schematic block diagram of an electronic apparatus according to one embodiment of the present disclosure.

According to another aspect, an embodiment of the present disclosure provides an electronic apparatus, as shown in FIG. 3, including: a processor, a memory and an I/O interface.

The memory stores corresponding modules for implementing the vehicle scheduling system according to the embodiment of the present disclosure.

The processor is configured to execute the modules stored in the memory to execute the vehicle scheduling system according to the embodiment of the present disclosure.

The processor is a device with data processing capability, which includes, but is not limited to a Central Processing Unit (CPU) and the like; the memory is a device with data storage capability, which includes, but is not limited to a random access memory (RAM, more specifically SDRAM, DDR, etc.), a Read Only Memory (ROM), an Electrically Erasable Programmable Read Only Memory (EEPROM), and a flash memory (FLASH). In some embodiments, the processor may be a server or a server group. The server group may be centralized or distributed. In some embodiments, the server may be local or remote.

The I/O interface (read/write interface) is connected between the processor and the memory, and is configured for implementing information interaction between the memory and the processor, which includes, but is not limited to a data bus (Bus) and the like.

Figure 4:
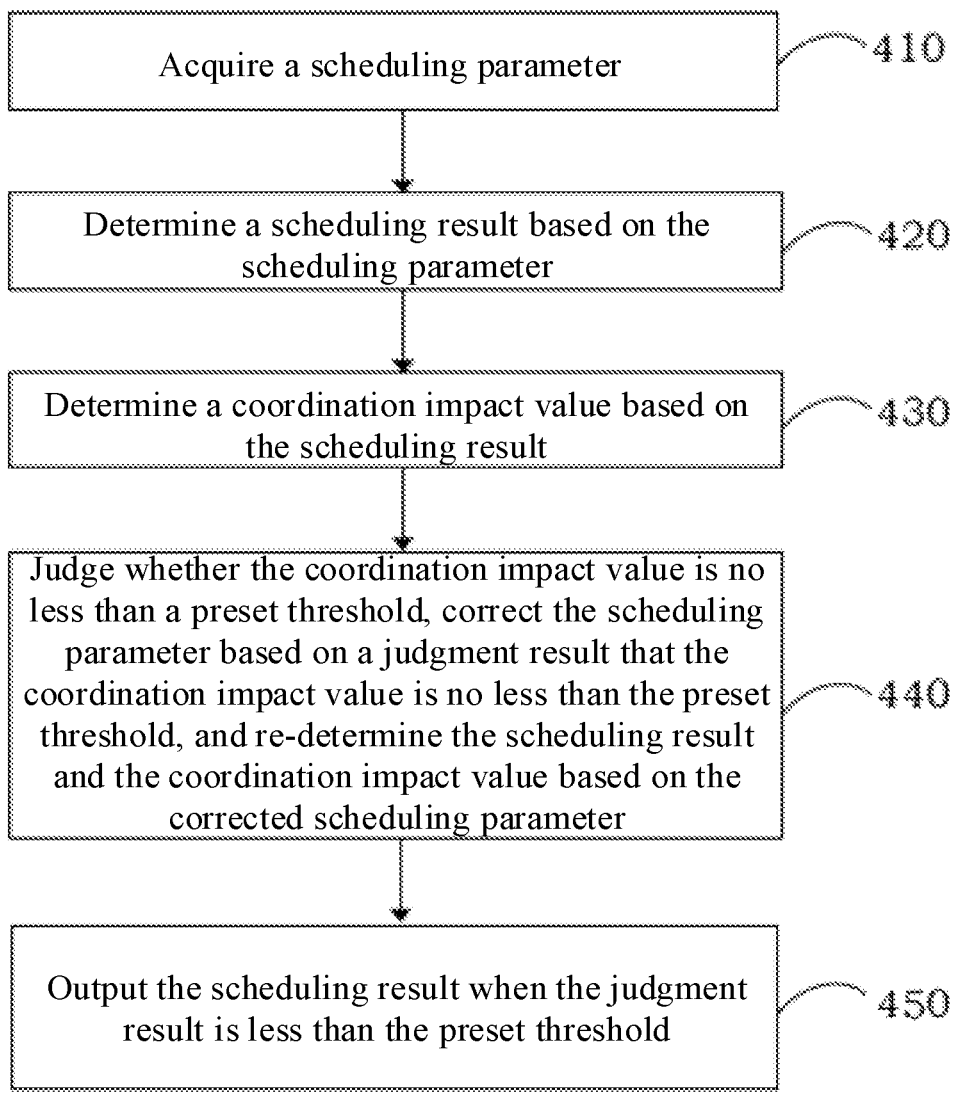
FIG. 4 shows a schematic flowchart of a scheduling method according to one embodiment of the present disclosure.
Figure 5:
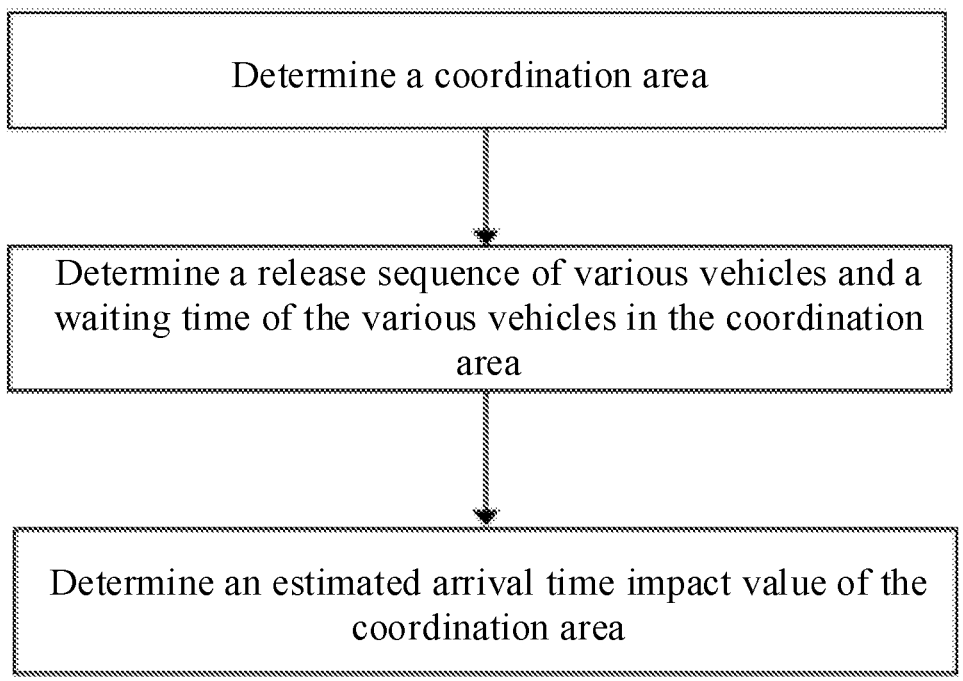
FIG. 5 shows a schematic flowchart of determining a coordination impact value according to one embodiment of the present disclosure.
Figure 6:
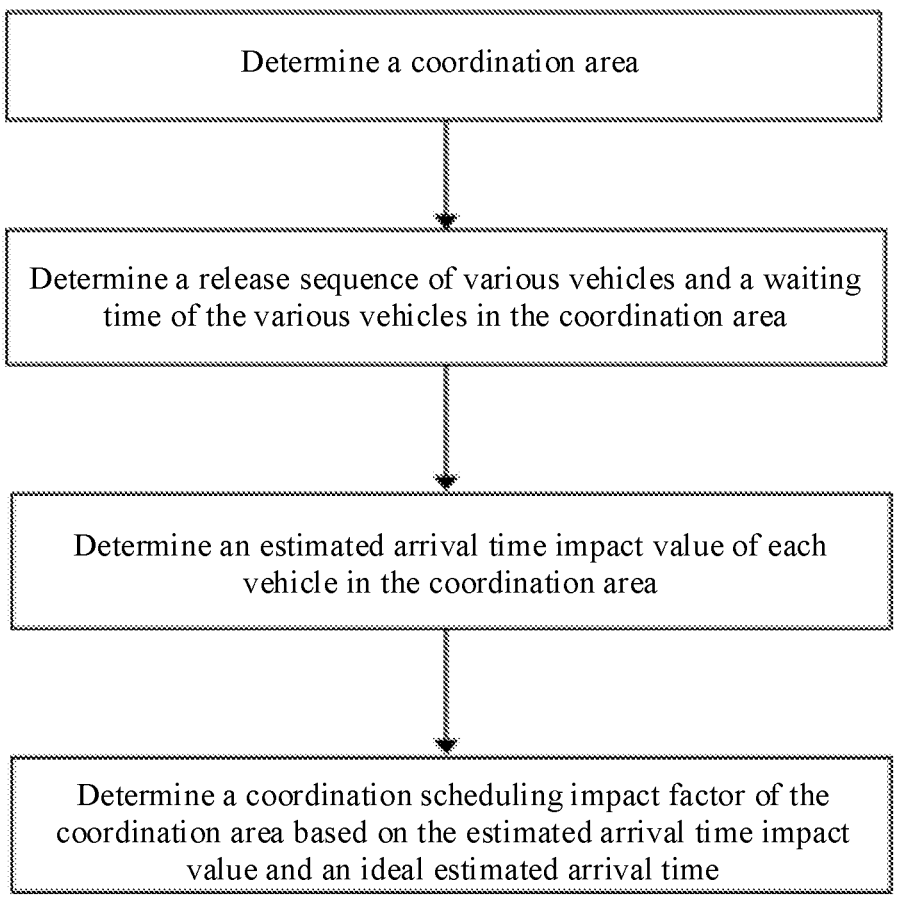
FIG. 6 shows a schematic flowchart of determining a coordination impact value according to one embodiment of the present disclosure.

According to another aspect, an embodiment of the present disclosure provides a multi-vehicle coordination-based vehicle scheduling method. The steps of the vehicle scheduling method provided by this embodiment are respectively executed by the modules of the vehicle scheduling system in the foregoing. Only the main steps of the vehicle scheduling method will be described below, and the details that have been described above will be omitted. Referring to FIG. 4, the vehicle scheduling method according to the embodiment of the present disclosure includes:

At step 410, the server acquires a scheduling parameter.

In some embodiments, the scheduling parameter includes a transportation task attribute and a scheduling condition.

The transportation task attribute includes a starting point and an ending point of a transportation task. In some embodiments, the task attribute further includes at least one of a transportation volume of the transportation task, an earliest starting time of the transportation task, a latest starting time of the transportation task, an earliest ending time of the transportation task and a latest ending time of the transportation task.

In some embodiments, the scheduling parameter further includes a vehicle attribute. In some embodiments, the vehicle attribute includes at least one of a vehicle capacity, a vehicle load and vehicle energy consumption.

In some embodiments, the vehicle attribute includes an estimated arrival time of a vehicle in a transportation area, where the estimated arrival time includes an estimated arrival time for each vehicle among various places in the operating area; and the estimated arrival time of the vehicle is a time required for the vehicle to travel from one place to another place, which is counted based on historical data. For ease of distinction, the estimated arrival time in the vehicle attribute is referred to as an estimated arrival time before coordination.

In some embodiments, the vehicle attribute includes at least one of a vehicle capacity, a vehicle load and vehicle energy consumption.

In some embodiments, the scheduling condition includes at least one of a shortest total travel distance, a shortest total time for the vehicle to complete the transportation task, minimum total vehicle energy consumption of the vehicle, and a minimum number of called vehicles.

At step 420, the server determines a scheduling result based on the scheduling parameter.

In some embodiments, the determining the scheduling result based on the scheduling parameter includes: determining the scheduling result by using a meta-heuristic algorithm based on static scheduling; and determining the scheduling result by using a heuristic algorithm based on dynamic scheduling.

In some embodiments, the scheduling result includes: multiple-to-one, one-to-multiple or multiple-to-multiple mapping between the transportation task and the vehicle; and the estimated arrival time of the vehicle. One or more of a departure sequence, a departure time and a completion time of the vehicle are determined based on the scheduling result.

The multiple-to-one mapping between the transportation task and the vehicle means that multiple transportation tasks are completed by one vehicle; the one-to-multiple mapping between the transportation task and the vehicle means that one transportation task is completed by multiple vehicles; and the multiple-to-multiple mapping between the transportation task and the vehicle means that multiple transportation tasks are completed by multiple vehicles.

At step 430, the server determines a coordination impact value based on the scheduling result.

The coordination impact value refers to an impact on the estimated arrival time caused by multiple vehicles when completing the transportation task. In some embodiments, the coordinated impact value includes an estimated arrival time impact value or a coordinated scheduling impact factor. The estimated arrival time impact value refers to an impact on the estimated arrival time of each vehicle in an area that needs coordination. The coordination module 330 determines the area that needs coordination and coordination vehicles according to the scheduling result, determines a release sequence and a waiting time of each coordination vehicle in the coordination area, determines an estimated arrival time of each vehicle after coordination based on the release sequence and scheduling time, and determines the impact value based on the estimated arrival time after coordination and the estimated arrival time before coordination.

The estimated arrival time impact value refers to a difference of the estimated arrival time of the vehicle after coordination and the corresponding estimated arrival time of the vehicle before coordination. Due to the phenomenon of waiting for some vehicles in multi-vehicle coordination, the estimated arrival time of these vehicles to some task points will become larger. The estimated arrival time impact value refers to subtracting the estimated arrival time before coordination from the estimated arrival time of the vehicles after coordination, and the estimated arrival time impact value is a positive number.

The estimated arrival time impact value of the coordination area refers to a sum of the estimated arrival time impact values of all vehicles in the area.

In some embodiments, the coordination scheduling impact factor is a ratio of an estimated arrival time impact value for one vehicle to complete a transportation task to the estimated arrival time before coordination.

The coordination scheduling impact factor of the coordination area refers to a sum of the coordination scheduling impact factors of all vehicles in the area.

In some embodiments, the coordination impact value is the estimated arrival time impact value, and the determining the coordination impact value includes: determining a coordination area; determining a release sequence of each vehicle and a waiting time of each vehicle in the coordination area; and determining the estimated arrival time impact value of the coordination area.

In some embodiments, the coordination impact value is the coordination scheduling impact factor, and the determining the coordination impact value includes: determining a coordination area; determining a release sequence of each vehicle and a waiting time of each vehicle in the coordination area; determining the estimated arrival time impact value of each vehicle in the coordination area; and determining the coordination scheduling impact factor of the coordination area based on the estimated arrival time impact value and the estimated arrival time before coordination.

At step 440, the server judges whether the coordination impact value is no less than a preset threshold, corrects the scheduling parameter based on a judgment result that the coordination impact value is no less than the preset threshold, and re-determines the scheduling result and the coordination impact value based on the corrected scheduling parameter.

In some embodiments, the correcting the scheduling parameter includes at least one of: adjusting an estimated arrival time in an area with a maximum coordination impact value; adjusting the estimated arrival time of the vehicle to complete the transportation task; and adjusting a driving route of the vehicle.

The adjusting the estimated arrival time in the area with the maximum coordination impact value refers to adjusting an estimated arrival time after coordination of the vehicle leaving the coordination area to a starting point and an ending point of a subsequent task.

At step 450, the server outputs the scheduling result when the judgment result is less than the preset threshold.

In conclusion, the vehicle scheduling methods according to the embodiments of the present disclosure may be used for scheduling multiple vehicles. Sequence order and task assignment problems when scheduling multiple vehicles are effectively solved, and problems of multi-vehicle conflict, congestion and impractical arrangement caused by multi-vehicle operation are perfected and solved, thus effectively improving the completion efficiency of transportation tasks.

According to another aspect, an embodiment of the present disclosure provides a computer-readable medium storing a computer program or instruction thereon, where the program, when being executed by a processor, implements the vehicle scheduling method according to any embodiment of the present disclosure.

Those skilled in the art may understand that the technical solutions of the present disclosure may be implemented in the form of electronic hardware, computer software, or integration of the hardware and software by combining the exemplary units and algorithm steps described in the embodiments of the present disclosure. Whether the functions are implemented in hardware or software depends on specific applications and designed limitations of the technical solutions. Those skilled in the art may use different methods to implement the functions in the case of the specific applications. However, this implementation shall not be considered going beyond the scope of the present disclosure.

Similarly, it should be appreciated that in order to simplify the disclosure and help to understand one or more of various aspects of the disclosure, some features of the disclosure may, in certain cases, be combined in a single embodiment, diagram or description thereof in the above description of illustrative embodiments of the disclosure. However, this method of the disclosure is not to be interpreted as reflecting an intention that the claimed embodiments of the subject matter requires more features than are expressly recited in each claim. More specifically, as the following claims reflect, the disclosure may lie in less than all features of a single disclosed embodiment. Thus the claims following the specific embodiments are hereby incorporated into the detailed description, with each claim standing on its own as a separate embodiment.

It should be noted that the above-mentioned embodiments illustrate rather than limit the disclosure, and that those skilled in the art will be capable of designing many alternative embodiments without departing from the scope of the disclosure as defined by the appended claims. Any reference sings placed between parentheses shall not be construed as limiting the claim. The word "including" does not exclude the presence of elements or steps not listed in a claim. The word "a" or "an" preceding an element does not exclude the presence of a plurality of such elements. The disclosure can be implemented by means of hardware including several distinct elements and by means of a suitable programmed computer. Several of these means can be embodied by one and the same item of hardware. The use of the words first, second and third etc do not indicate any ordering. These words are to be interpreted as names.

The above, only for the specific embodiment of the present disclosure or a description of the specific embodiment, the scope of protection of the present disclosure is not limited to this, any technical person familiar with the technical field disclosed in the scope of the technology, can easily think of change or replacement, should be covered within the scope of protection of the present disclosure. The protection scopes of the present disclosure shall be subject to the protection scopes of the claims.

What is claimed is:

1. An unmanned multi-vehicle control system, comprising:
    an electronic apparatus, and
    multiple vehicles configured to receive scheduling results from the electronic apparatus, wherein the multiple vehicles are unmanned vehicles;
    wherein the electronic apparatus includes a processor and a memory, the memory storing computer-readable modules, and when the processor executes the computer-readable modules in the memory, the electronic apparatus performs the following steps:
    acquiring, for each vehicle of the multiple vehicles, a scheduling parameter based on the multiple vehicles are in cooperation to complete tasks;
    determining, for each vehicle of the multiple vehicles, a scheduling result based on the scheduling parameter;
    determining, for each vehicle of the multiple vehicles, a coordination impact value by comparing the scheduling result of the vehicle when the multiple vehicles are in cooperation to complete the tasks and a result of the vehicle when the multiple vehicles are not in cooperation to complete the tasks;
    determining a coordination impact value of a coordination area by summing the coordination impact value of each vehicle in the coordination area;
    judging whether the coordination impact value of the coordination area is no less than a preset threshold, correcting the scheduling parameter of each of the multiple vehicles based on a judgment result that the coordination impact value of the coordination area is no less than the preset threshold, and re-determining the scheduling result of each of the multiple vehicles and the coordination impact value of the coordination area based on the corrected scheduling parameter of each of the multiple vehicles;
    generating a control instruction for each of the multiple vehicles based on the scheduling result re-determined after a judgment result that the coordination impact value of the coordination area is less than the preset threshold;
    sending the control instruction to each of the multiple vehicles;
    receiving, by each of the multiple vehicles, the control instruction; and
    controlling, by each of the multiple vehicles, how each of the multiple vehicles travels according to the control instruction received by each of the multiple vehicles.

2. The system according to claim 1, wherein the scheduling parameter comprises a transportation task attribute, a scheduling condition and a vehicle attribute, and the transportation task attribute comprises a starting point and an ending point of a transportation task; and
    the transportation task attribute further comprises at least one of a transportation volume of the transportation task, an earliest starting time of the transportation task, a latest starting time of the transportation task, an earliest ending time of the transportation task and a latest ending time of the transportation task.

3. The system according to claim 2, wherein the vehicle attribute comprises a set of an estimated arrival time of a vehicle before a coordination, wherein:
    the set of the estimated arrival time of the vehicle before the coordination refers to an estimated arrival time of multiple vehicles before the coordination among various places in an operating area; and
    the estimated arrival time of the vehicle before the coordination is a time for the vehicle to drive from one place to another place according to historical data.

4. The system according to claim 3, wherein the vehicle attribute further comprises at least one of a vehicle capacity, a vehicle load and a vehicle energy consumption.

5. The system according to claim 2, wherein the scheduling condition comprises at least one of a shortest total travel distance of a vehicle, a shortest total time for the vehicle to complete the transportation task, a minimum total energy consumption of the vehicle and a minimum number of called vehicles.

6. The system according to claim 1, wherein said determining the scheduling result based on the scheduling parameter comprises:
    determining the scheduling result by using a meta-heuristic algorithm based on a static scheduling; and
    determining the scheduling result by using a heuristic algorithm based on a dynamic scheduling; and
    the scheduling result comprises:
    a multiple-to-one, one-to-multiple or multiple-to-multiple mapping between a transportation task and a vehicle.

7. The system according to claim 6, wherein an estimated arrival time of the vehicle after a coordination; and
    one or more of a departure sequence, a departure time and a completion time of the vehicle are determined based on the scheduling result.

8. The system according to claim 1, wherein the coordination impact value comprises an estimated arrival time impact value or a coordination scheduling impact factor, wherein:
    the estimated arrival time impact value refers to a sum of differences obtained by subtracting an estimated arrival time before a coordination from an estimated arrival time after a coordination of the vehicle before the coordination and after the coordination arriving various places to complete the transportation task; and the coordination scheduling impact factor refers to a ratio of the estimated arrival time impact value to a total duration for completing the transportation task before the coordination.

9. The system according to claim 8, wherein the coordination impact value is the estimated arrival time impact value, and said determining the coordination impact value of the coordination area comprises:

determining the coordination area;

determining a release sequence of various vehicles and a waiting time of the various vehicles in the coordination area; and determining the coordination impact value of the coordination area based on the release sequence, the waiting time and the scheduling result.

10. The system according to claim 8, wherein the coordination impact value is the coordination scheduling impact factor, and said determining the coordination impact value of the coordination area comprises:

determining the coordination area;

determining a release sequence of various vehicles and a waiting time of the various vehicles in the coordination area;

determining the coordination impact value of the coordination area based on the release sequence, the waiting time and the scheduling result; and determining the coordination scheduling impact factor of the coordination area based on the estimated arrival time impact value and the estimated arrival time before the coordination.

11. The system according to claim 1, wherein said correcting the scheduling parameter comprises at least one of the followings:

adjusting an estimated arrival time of a vehicle after a coordination; and adjusting a driving route of the vehicle.

12. The system according to claim 11, wherein said adjusting the estimated arrival time in an area with a maximum coordination impact value of the coordination area refers to adjusting an estimated arrival time after the coordination of the vehicle leaving the coordination area to a starting point and an ending point of a subsequent task.

13. An unmanned multi-vehicle control method, comprising:

acquiring, by a server, a scheduling parameter for each vehicle of multiple vehicles based on the multiple vehicles are in cooperation to complete tasks, wherein the multiple vehicles are unmanned vehicles;

determining, by the server, a scheduling result for each vehicle of the multiple vehicles based on the scheduling parameter;

determining, by the server, a coordination impact value for each vehicle of the multiple vehicles by comparing the scheduling result of the vehicle when the multiple vehicles are in cooperation to complete the tasks and a result of the vehicle when the multiple vehicles are not in cooperation to complete the tasks;

determining a coordination impact value of a coordination area by summing the coordination impact value of each vehicle in the coordination area;

judging, by the server, whether the coordination impact value of the coordination area is no less than a preset threshold, correcting the scheduling parameter of each of the multiple vehicles based on a judgment result that the coordination impact value of the coordination area is no less than the preset threshold, and re-determining the scheduling result of each of the multiple vehicles and the coordination impact value of the coordination area based on the corrected scheduling parameter of each of the multiple vehicles;

generating, by the server, a control instruction for each of the multiple vehicles based on the scheduling result re-determined after a judgment result that the coordination impact value of the coordination area is less than the preset threshold;

sending, by the server, the control instruction to each of the multiple vehicles;

receiving, by each of the multiple vehicles, the control instruction; and controlling, by each of the multiple vehicles, how each of the multiple vehicles travels according to the control instruction received by each of the multiple vehicles.

14. The method according to claim 13, wherein the scheduling parameter comprises a transportation task attribute, a vehicle attribute and a scheduling condition, wherein:

the transportation task attribute comprises a starting point and an ending point of a transportation task, and further comprises at least one of a transportation volume of the transportation task, an earliest starting time of the transportation task, a latest starting time of the transportation task, an earliest ending time of the transportation task and a latest ending time of the transportation task;

the vehicle attribute comprises at least one of a vehicle capacity, a vehicle load and a vehicle energy consumption; and the scheduling condition comprises at least one of a shortest total travel distance of the vehicle, a shortest total time for the vehicle to complete the transportation task, a minimum total energy consumption of the vehicle and a minimum number of called vehicles.

15. The method according to claim 14, wherein the vehicle attribute further comprises a set of an estimated arrival time of a vehicle before a coordination, wherein:

the set of the estimated arrival time of the vehicle before the coordination refers to an estimated arrival time of multiple vehicles before the coordination among various places in an operating area; and the estimated arrival time of the vehicle before the coordination is a time for the vehicle to drive from one place to another place according to historical data.

16. The method according to claim 13, wherein the scheduling result comprises:

a multiple-to-one, one-to-multiple or multiple-to-multiple mapping between a transportation task and a vehicle.

17. The method according to claim 13, wherein the coordination impact value is an estimated arrival time impact value, and said determining the coordination impact value of the coordination area comprises:

determining the coordination area;

determining a release sequence of various vehicles and a waiting time of the various vehicles in the coordination area; and determining the coordination impact value of the coordination area based on the release sequence, the waiting time and the scheduling result.

18. The method according to claim 13, wherein the coordination impact value is a coordination scheduling impact factor, and said determining the coordination impact value of the coordination area comprises:

determining the coordination area;
determining a release sequence of various vehicles and a waiting time of the various vehicles in the coordination area;
determining the coordination impact value of the coordination area based on the release sequence, the waiting time and the scheduling result; and
determining the coordination scheduling impact factor of the coordination area based on an estimated arrival time impact value and an estimated arrival time before a coordination.

19. The method according to claim 13, wherein said correcting the scheduling parameter comprises adjusting an estimated arrival time in an area with a maximum coordination impact value, and
said adjusting the estimated arrival time in the area with the maximum coordination impact value of the coordination area refers to adjusting a time for a vehicle from driving into the area with the maximum coordination impact value to leaving the area with the maximum coordination impact value of the coordination area.

\* \* \* \* \*